No. 780,708. PATENTED JAN. 24, 1905.
J. J. A. COLLINS.
FERTILIZER DISTRIBUTER.
APPLICATION FILED JUNE 13, 1904.

2 SHEETS—SHEET 1.

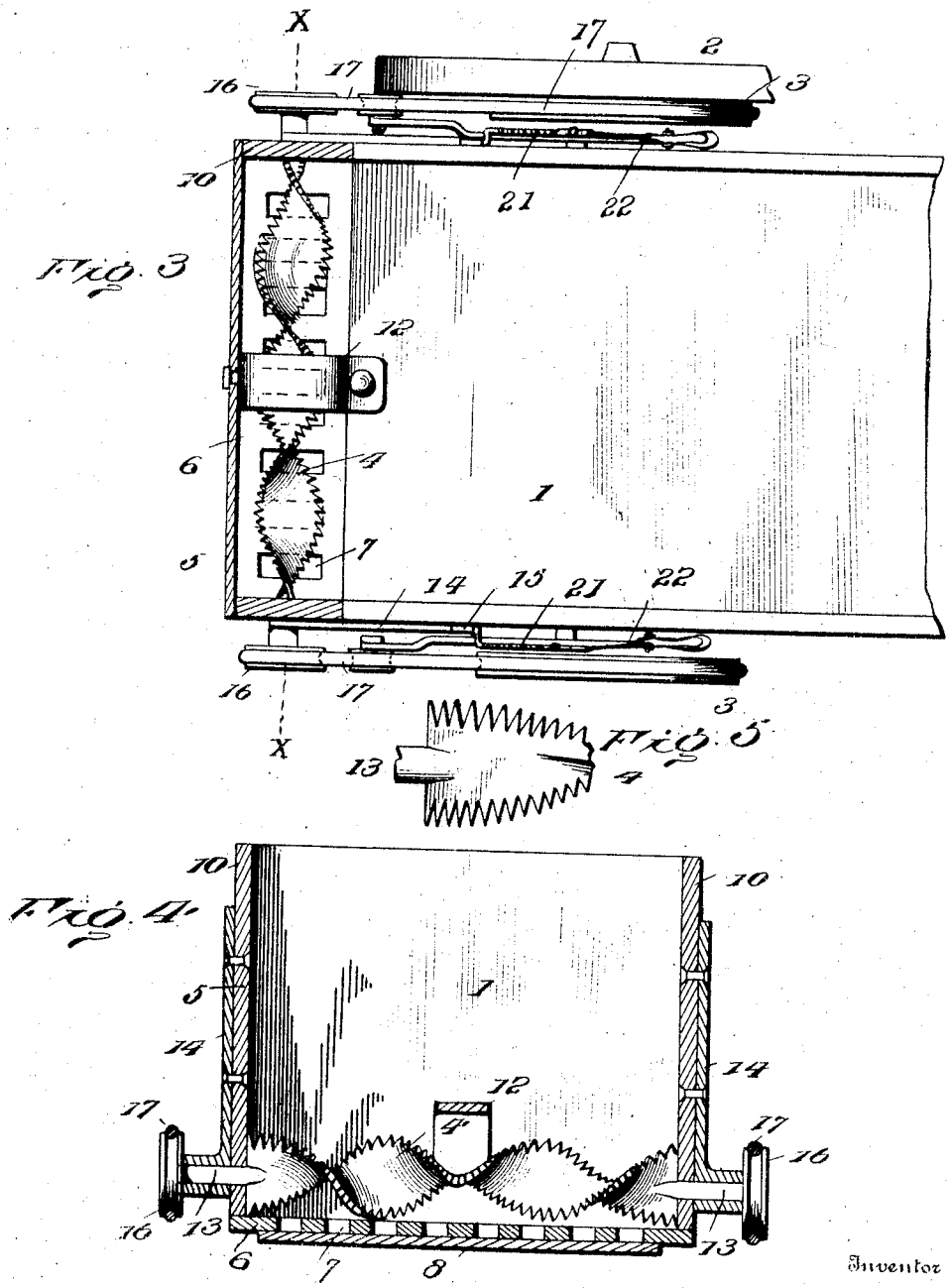

No. 780,708.

Patented January 24, 1905.

UNITED STATES PATENT OFFICE.

JOHN J. A. COLLINS, OF DOYLINE, LOUISIANA.

FERTILIZER-DISTRIBUTER.

SPECIFICATION forming part of Letters Patent No. 780,708, dated January 24, 1905.

Application filed June 13, 1904. Serial No. 212,372.

*To all whom it may concern:*

Be it known that I, JOHN J. A. COLLINS, a citizen of the United States, residing at Doyline, in the parish of Webster and State of Louisiana, have invented certain new and useful Improvements in Fertilizer-Distributers, of which the following is a specification.

The primary object of this invention is the provision of a distributer of fertilizer which may be attached to any ordinary farm-wagon for delivering compost, manure, ashes, lime, or other fertilizer either broadcast or in drills, the appliance being of such formation as to readily disconnect it from the wagon when not required for immediate use or to be quickly applied thereto for service.

The attachment comprises a hopper having discharge-openings in its bottom, a cut-off for regulating the effective size of the discharge-openings, a feeder for moving the fertilizer over the bottom of the hopper and at the same time insuring positive delivery of said fertilizer, attaching means of novel formation for securing the hopper to the body of a wagon, and actuating means for operating the feeder from a wheel of the wagon.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
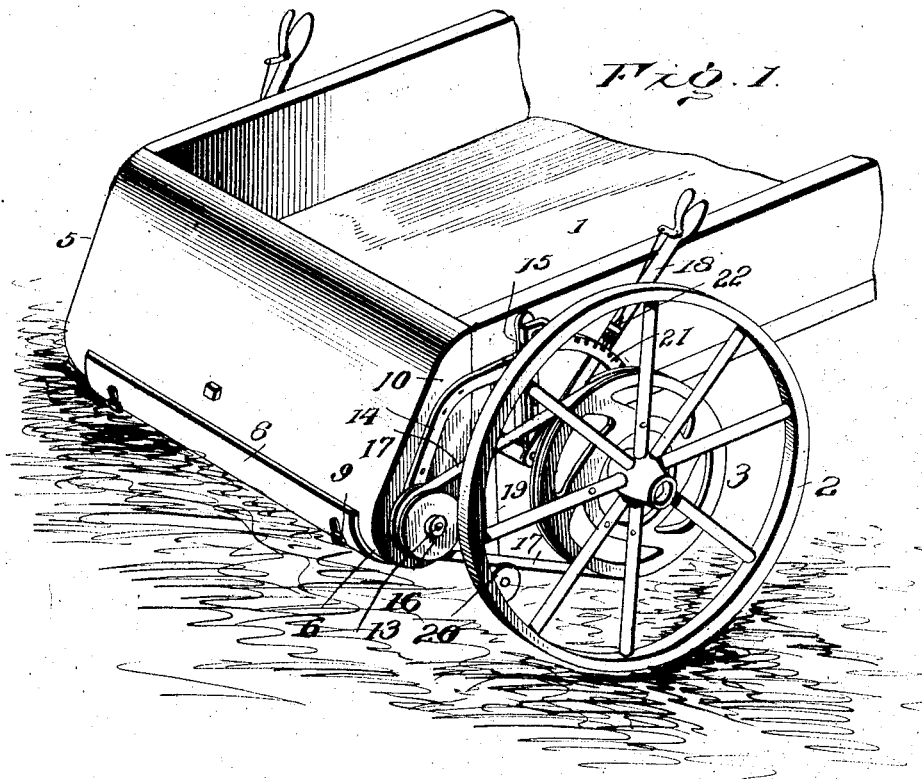
Figure 2:
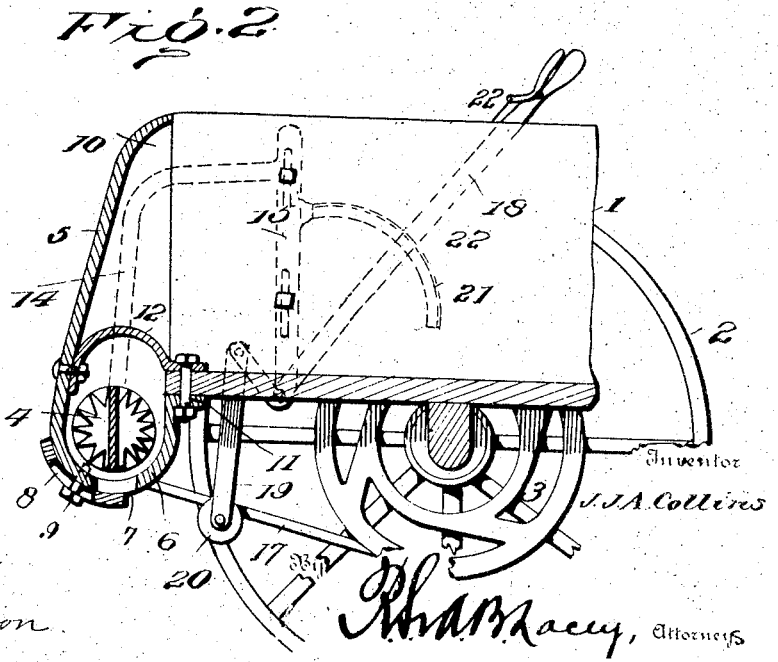

Figure 1 is a perspective view of the rear portion of a farm-wagon having the invention applied thereto. Fig. 2 is a longitudinal section of the parts shown in Fig. 1. Fig. 3 is a top plan view of the parts illustrated in Fig. 1. Fig. 4 is a section on the line X X of Fig. 3. Fig. 5 is a detail view of a portion of the feeder on a larger scale.

Corresponding and like parts are referred to in the following description and indicated in all the views of the drawings by the same reference characters.

The body of the wagon to which the attachment is fitted is indicated at 1 and the rear wheels thereof at 2. A band-pulley 3 of any construction is secured to or forms a part of one or both of the wheels 2, so as to rotate therewith and impart movement to the feeder 4, arranged in the bottom of the hopper 5, into which the fertilizer is supplied by hand or other manner when the invention is in operation. The hopper 5 is of such construction as to close the rear end of the wagon-body, as indicated most clearly in Fig. 2. The bottom portion of the hopper is of trough form, as indicated at 6, and projects below the bottom of the wagon-body and is formed with a series of openings 7, through which the fertilizer is delivered. A cut-off 8 is provided for regulating the effective size of the discharge-openings 7 and is secured in the located position by fastenings 9. The end pieces 10 of the hopper are preferably of wood and are upwardly tapered. The bottom portion and the rear wall of the hopper are preferably of integral formation, being constructed of sheet metal. A flange 11, extended outward from the lower front wall of the bottom portion of the hopper, underlaps the bottom of the wagon-body and is bolted or otherwise secured thereto. A bracket 12, arranged above the bottom portion of the hopper, is secured at one end to the latter and at its opposite end to the bottom of the wagon-body 1. The front edges of the end pieces 10 abut against the rear ends of the side-boards of the wagon-body 1, so as to make a close joint therewith. The upper edge portion of the rear wall of the hopper curves forward to the plane of the front edges of the end pieces 10 to confine the fertilizer and direct it downward.

The feeder 4, located within the bottom portion of the hopper, is of spiral form. The flights or spiral wings of the feeder incline in opposite directions from a central point, so as to uniformly feed the fertilizer from the center of the hopper toward the ends thereof. The journals 13 at the ends of the feeder 4 are mounted in bearings at the lower end of the brackets 14, which are secured to the end pieces 10 of the hopper and are extended beyond the front edges of said end pieces, so as to be connected to the side pieces of the wagon-body. The forward extensions 15 of the brackets 14 are vertically elongated and slotted, the slots receiving the fastenings securing the parts 15 to the sides of the wagon-body 1. Band-pulleys 16 are secured to the projecting ends of the journals 13 and are connected by drive-belts 17 with the band-pulleys 3.

Tension devices are provided for maintaining the drive-belts 17 sufficiently taut to positively transmit motion from the drive-pulleys 3 to the band-pulleys 16. Each tension device consists of a lever 18, fulcrumed to a side of the wagon-body, a link 19 pendent from the lower end of the lever 18, a pulley 20 for engagement with the lower portion of the drive-belt 17, and means for holding the lever 18 in an adjusted position, consisting of a toothed segment 21 and latch 22.

A distributer constructed substantially in the manner set forth and applied to any type of wagon is supplied with the fertilizer by having the latter shoveled or pushed into the hopper, and as the wagon is drawn over the field, the feeder being rotated in the manner stated, effects delivery of the fertilizer through the discharge-openings 7. The hopper is constantly supplied in any determinate way, the feed being effected either automatically or by hand, as may be elected. The appliance being in the nature of an attachment may be disconnected from the wagon when not required for immediate service, thereby admitting of the wagon being utilized in its ordinary capacity for draft or haulage purposes.

Having thus described the invention, what is claimed as new is—

1. A fertilizer-distributer comprising a hopper having a pendent trough-shaped portion formed with an outer flange to underlap the bottom of the wagon-body, and having its ends straight and adapted to abut against the ends of the side-boards of the wagon-body, and having its rear wall forwardly curved at its upper end and terminating in the plane of the front edges of said end pieces, a bracket extending over the pendent trough-shaped portion of the hopper for connecting the latter to the bottom of the wagon-body, brackets secured to the ends of the hopper and having extended portions for attachment to the sides of the wagon-body, a rotary feeder arranged in the bottom of the hopper and journaled at its ends in the brackets attached to the end pieces of the hopper, and means for operating said feeder, substantially as set forth.

2. A fertilizer-distributer attachment comprising a hopper open at its front side and having a pendent trough-shaped portion, brackets attached to the end pieces of the hopper and having forward extensions vertically elongated and slotted to receive fastenings, a rotary feeder arranged in the trough-shaped portion of the hopper and journaled in said brackets, and actuating means for the said feeder, substantially as set forth.

3. In combination, a hopper having a pendent lower portion of trough form provided with discharge-openings and having the upper portion of its rear wall forwardly curved, a cut-off for regulating the effective size of said openings, brackets attached to the ends of the hopper and having forward extensions to embrace opposite sides of the wagon-body and receive the fastening means, a feeder located in the lower trough-shaped portion of the hopper and journaled in said brackets, a band-pulley applied to the ground-wheel of the wagon, connecting means between said band-pulley and rotary feeder, and a tension device for the power-transmitting means, the same comprising a lever, a link provided with a pulley, and means for securing said lever in an adjusted position, substantially as set forth.

In testimony whereof I affix my signature in presence of two witnesses.

JOHN J. A. COLLINS. [L. S.]

Witnesses:
A. H. RATCLIFF,
G. W. BRITT.